United States Patent
Bell et al.

(10) Patent No.: US 10,921,996 B2
(45) Date of Patent: Feb. 16, 2021

(54) DATA LINES UPDATING FOR DATA GENERATION

(71) Applicant: Micron Technology, Inc., Boise, ID (US)

(72) Inventors: Debra M. Bell, Boise, ID (US); Naveh Malihi, University City, MO (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 16/361,864

(22) Filed: Mar. 22, 2019

(65) Prior Publication Data

US 2020/0301590 A1    Sep. 24, 2020

(51) Int. Cl.
| | | |
|---|---|---|
| G06F 21/79 | (2013.01) | |
| G06F 3/06 | (2006.01) | |
| G11C 7/06 | (2006.01) | |
| H03K 19/20 | (2006.01) | |

(52) U.S. Cl.
CPC .......... *G06F 3/0622* (2013.01); *G06F 3/0637* (2013.01); *G06F 3/0659* (2013.01); *G06F 3/0683* (2013.01); *G11C 7/06* (2013.01); *G06F 21/79* (2013.01); *H03K 19/20* (2013.01)

(58) Field of Classification Search
None
See application file for complete search history.

(56) References Cited

U.S. PATENT DOCUMENTS

| | | | |
|---|---|---|---|
| 6,038,188 A | 3/2000 | Akamatsu | |
| 6,044,031 A | 3/2000 | Clinton et al. | |
| 6,989,826 B2 | 1/2006 | Kasai | |
| 7,054,990 B1* | 5/2006 | Tamura | G06F 12/1466 711/103 |
| 9,251,099 B2 | 2/2016 | Kim et al. | |
| 2002/0136080 A1 | 9/2002 | Gold | |
| 2004/0255145 A1* | 12/2004 | Chow | G06F 12/1466 726/16 |
| 2005/0033970 A1 | 2/2005 | Anson et al. | |
| 2014/0325176 A1 | 10/2014 | Messina et al. | |
| 2017/0060782 A1 | 3/2017 | Chinnakkonda Vidyapoornachary et al. | |

FOREIGN PATENT DOCUMENTS

KR    1020140075848    6/2014

OTHER PUBLICATIONS

International Search Report and Written Opinion for related PCT Application No. PCT/US2020/017580, dated Jun. 5, 2020, 13 pages.

* cited by examiner

*Primary Examiner* — Brian R Peugh
(74) *Attorney, Agent, or Firm* — Brooks, Cameron & Huebsch, PLLC

(57) ABSTRACT

Apparatuses and methods related to updating data lines for data generation in, for example, a memory device or a computing system that includes a memory device. Updating data lines can include updating a plurality of data lines. The plurality of data lines can provide data form the memory array responsive to a receipt of the access command. The plurality of data lines can also be updated responsive to a determination that an access command received at a memory device is unauthorized.

21 Claims, 7 Drawing Sheets

US 10,921,996 B2

DATA LINES UPDATING FOR DATA GENERATION

TECHNICAL FIELD

The present disclosure relates generally to memory, and more particularly to apparatuses and methods associated with updating data lines for data generation.

BACKGROUND

Memory devices are typically provided as internal, semiconductor, integrated circuits in computers or other electronic devices. There are many different types of memory including volatile and non-volatile memory. Volatile memory can require power to maintain its data and includes random-access memory (RAM), dynamic random access memory (DRAM), and synchronous dynamic random access memory (SDRAM), among others. Non-volatile memory can provide persistent data by retaining stored data when not powered and can include NAND flash memory, NOR flash memory, read only memory (ROM), Electrically Erasable Programmable ROM (EEPROM), Erasable Programmable ROM (EPROM), and resistance variable memory such as phase change random access memory (PCRAM), resistive random access memory (RRAM), and magnetoresistive random access memory (MRAM), among others.

Memory is also utilized as volatile and non-volatile data storage for a wide range of electronic applications. including, but not limited to personal computers, portable memory sticks, digital cameras, cellular telephones, portable music players such as MP3 players, movie players, and other electronic devices. Memory cells can be arranged into arrays, with the arrays being used in memory devices.

Various computing systems include a number of processing resources that are coupled to memory (e.g., a memory system), which is accessed in association with executing a set of instructions (e.g., a program, applications, etc.). For various reasons, it can be desirable to prevent unauthorized access to memory (e.g., via read and/or write operations) or particular portions thereof. For instance, a memory system may store sensitive data (e.g., data desired to be kept secret, such as passwords, personal information, etc.).

DETAILED DESCRIPTION

Figure 1:
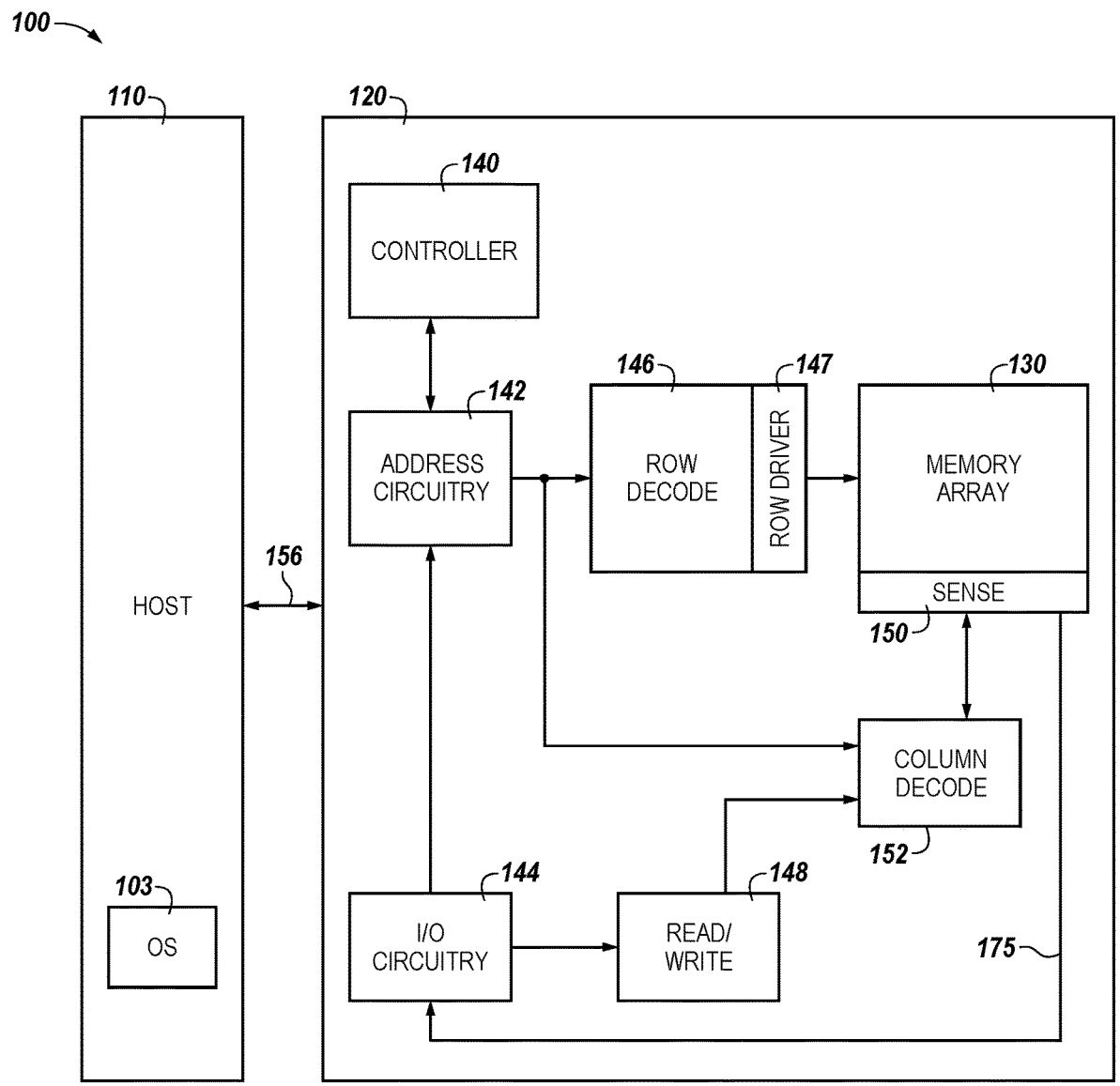
FIG. 1 is a block diagram of an apparatus in the form of a computing system including a memory device in accordance with a number of embodiments of the present disclosure.

The present disclosure includes apparatuses and methods related to updating data lines for data generation. Access commands can be provided from a host to a memory device. The memory device may rely on the host for implementing security measures to prevent unauthorized access to the memory device. However, implementing security measures at the memory device may further improve security and may mitigate unauthorized memory accesses. Implementing security measures can include rejecting access to unauthorized access commands. Responsive to rejecting access to unauthorized access commands, data can be generated to provide access to a host that provided the access command.

In various embodiments, a memory device can mitigate unauthorized memory accesses by verifying access commands as authorized utilizing credentials provided along with, or as part of, the access commands. The credentials can be stored in a plurality of registers implemented in the memory device prior to receipt of the access command (e.g., from a host). As used herein, an access command refers to a command executed to read data from or write data to an array of a memory device. An access command can include one or more sub-commands. For example, an access command can include one more of an activate command (e.g., a row activation command, which may be referred to as a row access command), a pre-charge command, a read command (e.g., a column read command), a write command (e.g., a column write command), and a refresh command, among various others. In various embodiments, an access command can be propagated into a plurality of access sub-commands. For example, a read access command might be propagated into sub-commands including a row activate command, a column read command, and a pre-charge command.

The authorization of an access command can be verified utilizing a key (e.g., credential(s)). The access command can target (e.g., request access to) an address and/or a plurality of addresses. The memory device can determine whether the address is locked or unlocked based on a security mode associated with the address. If the address is locked, then the memory device can refrain from providing access to the address unless a key associated with the access command is also provided to the memory device. The key can be verified against a stored key to determine whether to unlock the address.

If the key matches the stored key, then the memory device can unlock the address and can provide access to the address(es). If the key does not match the stored key, then the memory device can refrain from providing access to the address(es).

In a number of embodiments, data patterns output from the memory array via the data lines (DQs) can be changed. A row targeted for access may be inhibited due to an unauthorized access attempt being detected. However, inhibiting a row from being activated may not include inhibiting a sense amplifier and/or keeper latches from being accessed and/or activated. The DQs can be activated to generate a data pattern independent of the data stored in the array to prevent charges retain in the DQs from previous access commands from being output.

In various embodiments, a read command can be inhibited in addition to inhibiting the rows of the array or in place of inhibiting the row of the array. Inhibiting a read command may be an indirect means of inhibiting the rows of the array. Inhibiting the read command may include inhibiting the activation of the DQ. Inhibiting the activation of the DQ can change the data pattern output from the memory array such that no data pattern is output from the memory array. Inhibiting the read command may include inhibiting a sense amplifier and/or keeper latches from being accessed and/or activated. Although the examples described herein are in the context of direct inhibition of the DQs, the examples are not so limiting and can also include the indirect inhibition of the activation of DQs including the activation of keeper lathes from being accessed and/or activation.

As used herein, "a number of" something can refer to one or more of such things. For example, a number of memory devices can refer to one or more memory devices. A "plurality" of something intends two or more. Additionally, designators such as "N," as used herein, particularly with respect to reference numerals in the drawings, indicates that a number of the particular feature so designated can be included with a number of embodiments of the present disclosure.

The figures herein follow a numbering convention in which the first digit or digits correspond to the drawing figure number and the remaining digits identify an element or component in the drawing. Similar elements or components between different figures may be identified by the use of similar digits. As will be appreciated, elements shown in the various embodiments herein can be added, exchanged, and/or eliminated so as to provide a number of additional embodiments of the present disclosure. In addition, the proportion and the relative scale of the elements provided in the figures are intended to illustrate various embodiments of the present disclosure and are not to be used in a limiting sense.

FIG. 1 is a block diagram of an apparatus in the form of a computing system 100 including a memory device 120 in accordance with a number of embodiments of the present disclosure. As used herein, a memory device 120, a memory array 130, and/or host 110, for example, might also be separately considered an "apparatus."

In this example, system 100 includes a host 110 coupled to memory device 120 via an interface 156. The computing system 100 can be a personal laptop computer, a desktop computer, a digital camera, a mobile telephone, a memory card reader, or an Internet-of-Things (IoT) enabled device, among various other types of systems. Host 110 can include a number of processing resources (e.g., one or more processors, microprocessors, or some other type of controlling circuitry) capable of accessing memory 120. The system 100 can include separate integrated circuits, or both the host 110 and the memory device 120 can be on the same integrated circuit. For example, the host 110 may be a system controller of a memory system comprising multiple memory devices 120, with the system controller 110 providing access to the respective memory devices 120 by another processing resource such as a central processing unit (CPU).

In the example shown in FIG. 1, the host 110 is responsible for executing an operating system (OS) 103 and/or various applications that can be loaded thereto (e.g., from memory device 120 via controller 140). The host 110 may not be responsible for managing keys or addresses that define the protected region. The host 110 can provide access commands and/or security mode initialization commands to a memory device via the interface 156. In various examples, the memory device may provide an indication of an unauthorized access attempt. In various embodiments, the unauthorized access attempt can result in providing data to the host such that the issuer of the unauthorized access attempt is not notified of the memory device's identification of the unauthorized access attempt. The data received from the memory device 120 may not be the data stored by the memory cells having the address provided by the access command. The host 110 may receive data generated responsive to identifying the access command as unauthorized.

For clarity, the system 100 has been simplified to focus on features with particular relevance to the present disclosure. The memory array 130 can be a DRAM array, SRAM array, STT RAM array, PCRAM array, TRAM array, RRAM array, NAND flash array, and/or NOR flash array, for instance. The array 130 can comprise memory cells arranged in rows coupled by access lines (which may be referred to herein as word lines or select lines) and columns coupled by sense lines (which may be referred to herein as digit lines or data lines). Although a single array 130 is shown in FIG. 1, embodiments are not so limited. For instance, memory device 120 may include a number of arrays 130 (e.g., a number of banks of DRAM cells).

The memory device 120 includes address circuitry 142 to latch address signals provided over an interface 156. The interface can include, for example, a physical interface employing a suitable protocol (e.g., a data bus, an address bus, and a command bus, or a combined data/address/command bus). Such protocol may be custom or proprietary, or the interface 156 may employ a standardized protocol, such as Peripheral Component Interconnect Express (PCIe), Gen-Z, CCIX, or the like. Address signals are received and decoded by a row decoder 146 and a column decoder 152 to access the memory array 130. Data can be read from memory array 130 by sensing voltage and/or current changes on the sense lines using sensing circuitry 150. The sensing circuitry 150 can comprise, for example, sense amplifiers that can read and latch a page (e.g., row) of data from the memory array 130. The I/O circuitry 144 can be used for bi-directional data communication with host 110 over the interface 156. The read/write circuitry 148 is used to write data to the memory array 130 or read data from the memory array 130. As an example, the circuitry 148 can comprise various drivers, latch circuitry, etc.

Controller 140 decodes signals provided by the host 110. These signals can include chip enable signals, write enable signals, and address latch signals that are used to control operations performed on the memory array 130, including data read, data write, and data erase operations. In various embodiments, the controller 140 is responsible for executing instructions from the host 110. The controller 140 can comprise a state machine, a sequencer, and/or some other type of control circuitry, which may be implemented in the form of hardware, firmware, or software, or any combination of the three.

In accordance with various embodiments, the controller 140 can be configured to decode a security mode initialization command received thereto. The security mode initialization command can be received from the host 110. The security mode initialization command can be provided to the memory device 120 to set a security mode of the memory device 120 and/or to designate one or more protected regions of the memory device 120. A security mode can include a locked mode and an unlocked mode. The memory device 120 can be configured to provide access to a protected region of the memory array 130 if the memory device 120 is in an unlocked mode or to prevent access to the protected region of the memory array 130 if the memory device 120 is in a locked mode.

The OS 103, as executed by the host 110, can initialize the security mode initialization command to store a key and an address or a range of addresses of the memory array 130 in one or more registers of the controller 140. The stored key and address can define the protected region of the memory array 130. The OS 103 can initialize the security mode initialization command during an initialization of the OS 103 or a time after the OS 103 is initialized.

The address received from the host 110 can be a logical address. A logical address can be translated, mapped, or resolved to a physical address. A logical address can include a virtual address, for example. The physical address may be used by the memory device 130 to access data from a memory array 130. The physical address can be directly mapped to a memory cells or row of the memory array 130. The logical address corresponding to the initialization command and/or access commands and received from the host 110 can be translated by the memory device 120 to generate the physical address. The physical address can be a physical row address of the memory array 130.

The key can be a security token used to gain access to a protected region of the memory array 130. The key can be encrypted or unencrypted. The key can be provided by the OS 103 and used by the OS 103 to access the protected region of the memory array 130. The key can be unique to a protected region of memory and/or can be associated with a plurality of protected regions of memory. As described further below, the key can comprise one or more bits which can be stored in one or more registers of the memory device 120.

The protected region of the memory array 130 describes a region of the memory array 130 that is protected using the key. The protected range can be defined by a first memory address and a second memory address. The first memory address can be a starting address and the second memory address can be an ending address. In various examples, the protected range is stored as a starting address and as an offset. The offset together with the starting address can be used to generate the ending address. The protected region can be continuous from the starting address to the ending address.

In various examples, the memory array 130 can comprise one or more protected regions. Each of the protected regions can be defined using a starting address and an offset. Each of the starting addresses corresponding to a different protected region can be unique and/or can be a same starting address. Each of the offsets can also be a same offset or a different offset.

In various instances, the host 110 can provide an access command and/or a plurality of access sub-commands to the memory device 120. Access sub-commands can be provided to access a protected region of the memory device 120. The access sub-command can be associated with an address or a range of addresses and a key. The memory device 120 can compare the provided address to a protected range to determine whether the address is within the protected range. If the address is within the protected range, the memory device 120 can compare the key with a stored key to determine whether the key and the stored key match. If the key matches the stored key, then the memory device can enter a non-persistent unlocked mode from a locked mode. The memory device 120 can, via the controller 140, enable a row driver to activate a row of the memory array 130 corresponding to the address (e.g., protected region). Responsive to enabling the row driver, the memory device 120 can transition the protected region from a non-persistent unlocked mode to a locked mode. If the key does not match, the memory device 120 can, via the controller 140, prevent access to the protected region by preventing enablement of the row driver 147 of the memory array 130, thus preventing activation of a row corresponding to the access command.

Preventing access to the protected region can open security vulnerabilities. For example, if the access command is a read command, then inhibiting the activation of a row of the memory array 130 may not inhibit the activation of the data lines 175. The data lines 175 can provide data from the memory array 130 to the host 110. As such, processing the unauthorized access command can include activating data lines 175 even though the activation of a row of the memory array 130 is inhibited. Activating the data lines 175 may provide data stored in keeper latches of the data lines 175. The keeper latches can store data corresponding to a previous access command that was provided access to the memory array 130. The keeper latches can be coupled to the data lines 175. The keeper latches can hold charges provided by the sensing circuitry 150 to the sensing circuitry. In some examples, the keeper latch may have the ability to receive data from a controller 140 and drive the data lines 175 with charges provided by the controller 140. In some embodiments, a keeper latch may not be reset by the controller 140 to prevent energy usage.

For example, an access command (e.g., a prior access command) can provide access to the memory array 130 such that the data retrieved from the memory array 130 is stored in the keeper latches of the data lines 175. The processing of a subsequent unauthorized access command can include activating the data lines 175 such that the data corresponding to the prior access command is provided to the host 110. Providing data corresponding to a prior access command responsive to the processing of the subsequent unauthorized access command can provide a security vulnerability because valid data from the memory array 130 is provided subsequent to processing the subsequent unauthorized access command.

In various examples, processing an unauthorized access command can include activating the sense amplifiers 150 and a column of the memory array 130 such that data is provided from the memory array 130 even though an activation of a row of the memory array 130 is inhibited. The sense amplifiers 150 can latch data access responsive to processing an authorized access command and provide that latched data responsive to the processing of an unauthorized access command.

Both of the above vulnerabilities can provide valid data responsive to the processing of unauthorized access commands. To resolve the described security threats, the controller 140 can refrain from providing data to the host 110 and/or can provide data that does not correspond to unauthorized access commands or authorized access commands. Refraining from providing data responsive to the processing of the unauthorized access commands can provide notice that the access command was identified as unauthorized by the memory device 120.

Providing data that does not correspond to unauthorized access commands or authorized access commands can include generating the data responsive to processing the unauthorized access commands. Generating the data can include generating a same data pattern for a plurality of unauthorized access commands or different data patterns for each unauthorized access command.

Providing the same data pattern for each unauthorized access command can be interpreted as notice that the access command has been identified as unauthorized. Providing a different data pattern for each of the unauthorized access commands may not be interpreted as notice that the access command has been identified as unauthorized. Providing a same data pattern or a different data pattern for each unauthorized access command may be preferred over not providing data responsive to processing an unauthorized access command.

Figure 2:
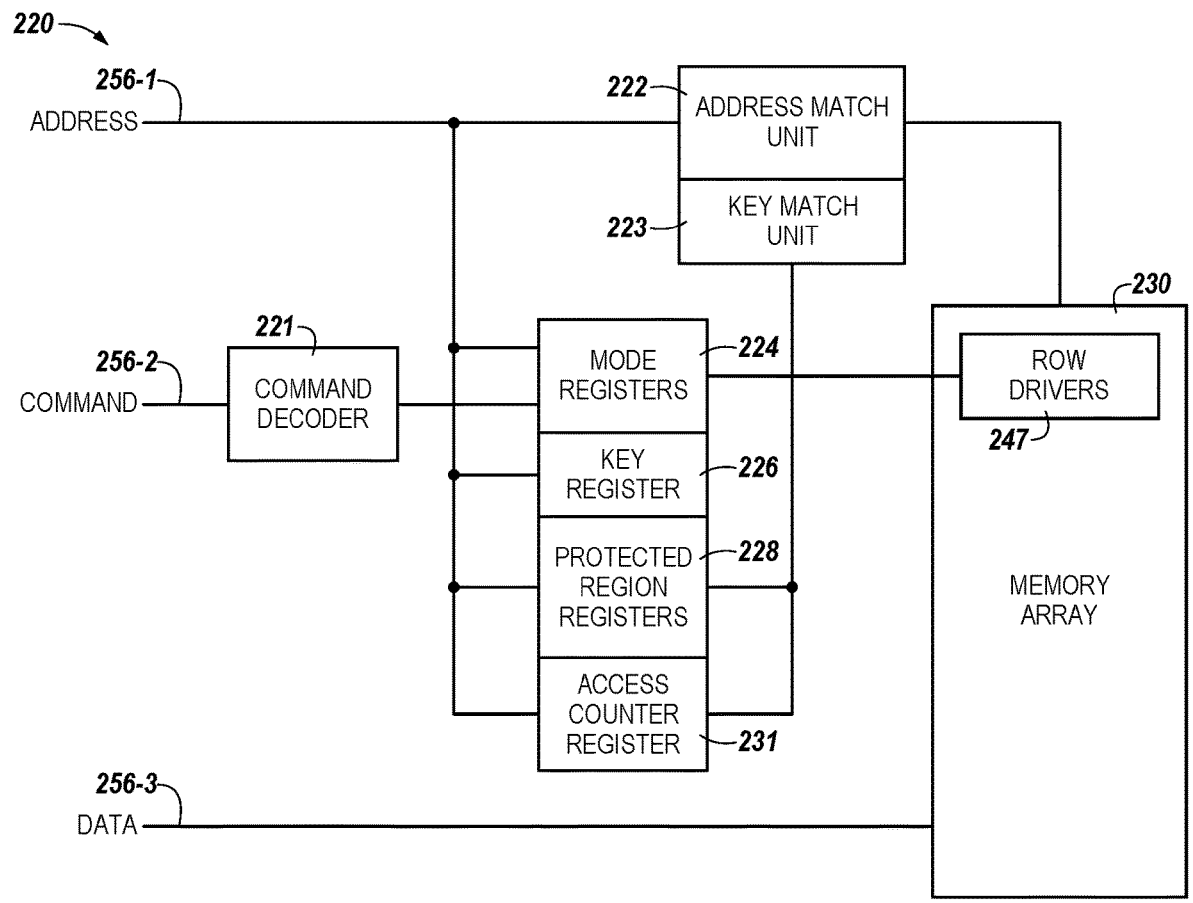
FIG. 2 is a block diagram of an apparatus in the form of a memory device including a memory array and portions of a controller capable of protecting regions of memory using a key in accordance with a number of embodiments of the present disclosure.

FIG. 2 is a block diagram of an apparatus in the form of a memory device 220 including a memory array 230 and portions of a controller capable of protecting regions of memory using a key in accordance with a number of embodiments of the present disclosure. The memory device 220 can be analogous to the memory device 120 in FIG. 1. The memory device 220 includes the memory array 230 and portions of a controller such as the controller 140 in FIG. 1.

The controller can include a command decoder 221, mode registers 224, a key register 226, protected region registers 228, and an access counter register 231. The controller can also include the address match unit 222 and a key match unit 223.

In this example, the interface (e.g., 156 shown in FIG. 1) comprises an address bus 256-1, a command bus 256-2, and a data bus 256-3. The device 220 can receive the security mode initialization command, access commands, and/or access sub-commands along with keys via the command bus 256-2. The device 220 can receive addresses via the address bus 256-1, and data can be provided to/from the device 220 via the data bus 256-3. The data lines (e.g., data lines 175 in FIG. 1) can provide data from the memory array 230 to the data bus 256-3 to provide data to a host.

A host can provide, via the command bus 256-2, the security mode initialization command to initialize a security mode of the memory device 220. The memory device 220 can receive the security mode initialization command at the command decoder 221. The command decoder 221 can decode the security mode initialization command.

In various examples, the security mode initialization command can be associated with a key and a number of addresses received via the command bus 256-2 and the address bus 256-1. The controller can store a key in the key register 226 and can store the one or more addresses in the protected region registers 228. Each of the mode registers 224, the key registers 226, the protected region registers 228, and/or the access counter register 231 can be comprised of one or more registers.

The one or more addresses can be stored in the protected region registers 228 as a starting address and an offset. The starting address can be stored in a first register of the protected regions registers 228 and the offset can be stored in a second register of the protected region registers 228. The starting address and the ending address can define a protected region of the memory array 230 which can be stored in the protected region register 228.

The key can be stored in the key register 226. In various examples, a plurality of keys can be stored in one or more key registers including the key register 226. Each of the plurality of keys can be associated with a different one of the plurality of protected regions stored in the protected region registers including the protected region register 228. The plurality of keys can be used to allow access to the protected regions. For example, a first key can be used to allow access to a first protected region and a second key can be used to allow access to a second protected region.

Responsive to storing the key in the key register 226 and the address in the protected region register 228, the controller can change a security mode of the memory device 220 from an unlocked mode (e.g., persistent unlocked mode) to a locked mode in the mode registers 224. The mode registers 224 can include a security mode register. The security mode register can store a first value representing a persistent unlocked mode, a second value representing a non-persistent unlocked mode, and/or a third value representing a locked mode, among other possible modes. The locked mode can be used to prevent access to a protected region of the memory array 230. A persistent unlocked mode can be used to allow a plurality of instances of access to a protected region of the memory array 230 where a first access is provided contingent on a first key and the remaining instances of access are provided without verifying additional keys. A non-persistent unlocked mode can be used to allow a plurality of instances of access to the protected region of the memory array 230 where each instance of access is provided contingent on the verification of a different instance of a same key. In a non-persistent unlocked mode, each instance of access is followed by placing the protected region in a locked mode.

In various examples, responsive to receipt of the security mode initialization command, the controller can set or reset an access counter register 231. For example, the access counter register 231 can be set to zero. The access counter register 231 can provide a count of unauthorized access commands and/or unauthorized access sub-commands directed to the protected region of the memory array 230 (e.g., as defined by protected region register 228).

The controller can also process access commands and/or access sub-commands. For example, an access sub-command received via the command bus 256-2 can be decoded by the command decoder 221. The address match unit 222 can receive an address corresponding to the access sub-command at the address match unit 222 of the controller. The address match unit 222 can determine whether the received address is within a protected region (e.g., as stored in the protected region register 228).

If the received address is in a protected region, then the controller, via the key match unit 223, can determine whether the key associated with the access sub-command matches a key stored in the key register 226. If the key associated with the access sub-command matches the key stored in the key register 226, then the controller can modify the mode registers 224 from a locked mode to a non-persistent unlocked mode.

The controller can provide a signal to the row drivers 247 to activate a row corresponding to the received address if the mode registers 224 reflect an unlocked mode (e.g., non-persistent unlocked mode or persistent unlocked mode). The controller can prevent a signal from being provided to the row drivers 247 if the mode registers 224 reflect a locked mode. Although the row drivers 247 are shown as being in the memory array 230, the row drivers 247 can also be implemented externally to the memory array 230 as shown in FIG. 1.

Responsive to providing a signal to the row drivers 247 while the protected region is in an un-persistent unlocked mode, the controller can place the protected region in a locked mode. In various embodiments, responsive to providing a signal to the row drivers 247 while the protected region is in a persistent unlocked mode, the controller may refrain from placing the protected region in the locked mode. In various examples, the controller may refrain from placing the protected region in the locked mode until a plurality of associated access sub-commands have been processed. The controller may refrain from placing the protected region in the locked mode until a pre-charge command, an activate command, and a read command or a write command (e.g., access sub-commands) have been processed by the controller. For example, a read command (e.g., read sequence) may be processed by activating one or more rows of a memory array 230. Activating a row of the memory array in association with activating a column of the memory array 230 may include moving charges from a memory cells coupled to the rows and/or the columns to a plurality of sensing amplifiers. The controller can move the charges from the sensing amplifiers to the DQs. Moving the charges to the DQs can include storing the charges in the keeper latches. Processing the read command can further include processing a precharge command to prepare the sensing amplifiers to receive charges.

An access command can be considered unauthorized if the key corresponding to the access command does not match a key stored in the key register 226. A key associated with the access command can be determined to not match a key stored in the key register 226 if no key is associated with the access command or if the key associated with the access command 226 does not have the same value as the key stored in key register 226. In some examples, a mismatch of the keys can be determined if the key stored in the key register 226 cannot be derived from the key associated with the access command. A key stored in the key register 226 can be derived from the key associated with the access command through an encryption process and/or a decryption process. In some instances, a key can be encrypted before being stored in the key register 226. The key associated with the access command may be unencrypted. Comparing an encrypted key with an unencrypted key can include decrypting an encrypted key and comparing the decrypted key with the unencrypted key. The encrypted key can be derived from the unencrypted key if the decrypted key matches the unencrypted key.

Although the key registers 224, the protected region registers 228, and the access counter registers 231, are shown as being separate from the mode registers 224, the key registers 224, the protected region registers 228, and/or the access counter registers 231 can be implemented as mode registers which can be included in the mode registers 224. In various instances, the key registers 224, the protected region registers 228, and/or the access counter registers 231 can be implemented as a combination of mode registers 224 and/or different types of registers used in the memory device 220. Accordingly, the mode registers 224, the key registers 226, the protected region registers 228, and/or the access counter registers 231 can be referred to generically as the registers 224, the registers 226, the registers 228, and/or the registers 231.

Figure 3:
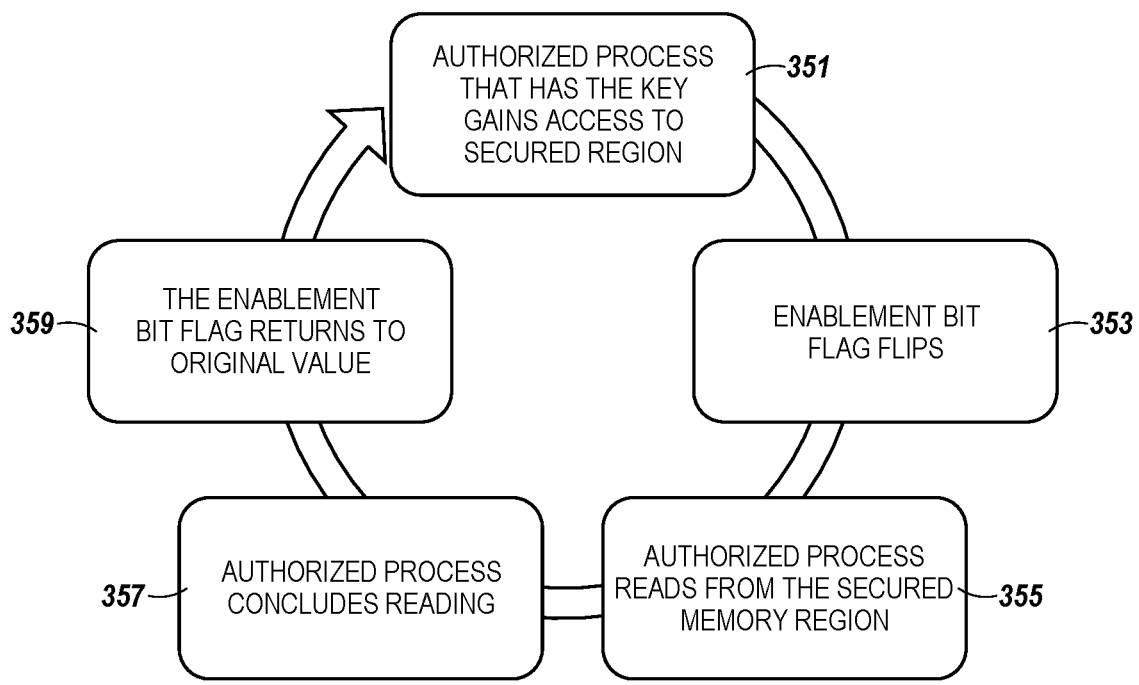
FIG. 3 illustrates an example flow diagram of a method for accessing a protected region of a memory array in accordance with a number of embodiments of the present disclosure.

FIG. 3 illustrates an example flow diagram of a method for accessing a protected region of a memory array in accordance with a number of embodiments of the present disclosure. At 351, the access sub-command that has the key gains access to the protected region. The access sub-command can be provided by a program that is being executed by the host such as an application process, an OS, a hypervisor, and/or a virtual machine (VM). For example, the access sub-command can be provided by an OS and/or a different application, among other possible processes. The access sub-command can be authorized upon verifying that a key associated with the access sub-command provided by a process matches a stored key in the key register.

At 353, the enablement bit flag can be flipped. The enablement bit flag can be stored in a security mode register show in FIG. 2 as one of the mode registers 224. The enablement bit flag can be flipped from a locked mode to a non-persistent unlocked mode. At 355, the authorized process can read from the protected region of memory. The access sub-command can be a read command or a write command, among other possible access commands. The controller can prevent enabling a row driver from activating a row responsive to the enablement bit flag indicating the locked mode, where the row corresponds to a received address associated with the access command. For example, the controller can prevent any row driver enablement when the mode bit indicated that a secured memory region is locked. In various examples, the controller can set the security mode register to a locked mode responsive to enabling the row driver and responsive to a prior state of the security mode register being a non-persistent locked mode. In other examples, the controller can refrain from setting the security mode register to a locked mode responsive to enabling the row driver and responsive to a prior state of the security mode register being a persistent locked mode. In a different embodiment, the controller can set the security mode register to a locked mode responsive to enabling the row driver and regardless of whether the prior state of the security mode register was a non-persistent locked mode or a persistent locked mode.

At 357, the authorized process can conclude reading from the protected region. At 359, the controller can return the enablement bit flag to its original value. For example, the enablement bit flag can be returned to a locked mode.

In various embodiments, an OS, hypervisor, and/or virtual machine can initiate a security mode initialization command. The security mode initialization command can be provided by the OS to define a protected region of a memory array and to associate a key with the protected region.

Defining a protected region utilizing the security mode initialization command provides the OS flexibility. The OS can have flexibility to define the size and content of a protected region of the memory array. For example, the OS can define the protected region as comprising a first size or a second size, among a number of other sizes. The OS can activate a security mode by providing the security mode initialization command or can refrain from activating the security mode by refraining from providing the security mode initialization command to the memory device.

A memory device can function in a security mode or without the security mode based on the OS's selection. Further, the OS can define a size or location of the protected region after the protected region has been initialized. For example, after initialization of a security mode, the OS can increase the size of the protected region or decrease the size of the protected region. After initialization of a security mode, the OS can also change a base address of the protected region and/or an offset of the protected region. The OS can also exit the security mode after the memory device has been placed in the security mode. For example, the OS can store a predefined value in the protected region registers. The OS can store a zero as a base address and/or an offset of the protected region to exit the security mode.

The OS can utilize an application programming interface (API) to generate the security mode initialization command, an access command, and/or an access sub-command used to define and/or access a protected region of the memory array. The OS can comply with the security features of the memory device utilizing the API.

In various examples, the security mode initialization command can be generated by the OS and/or received by the memory device as part of an initialization process of a computing device and/or the OS. The memory device can store a key in a key register responsive to receiving the security mode initialization command. The memory device can store an address of a memory device in a protected region register. The memory device can set a mode register based on the storing of the key and/or the storing of the address. The mode register can identify whether a region of the memory array is protected. The memory device can set the mode register to a locked mode. The locked mode can be a protected mode. The mode register can also be set to a persistent unlocked mode or a non-persistent unlocked mode.

Figure 4:
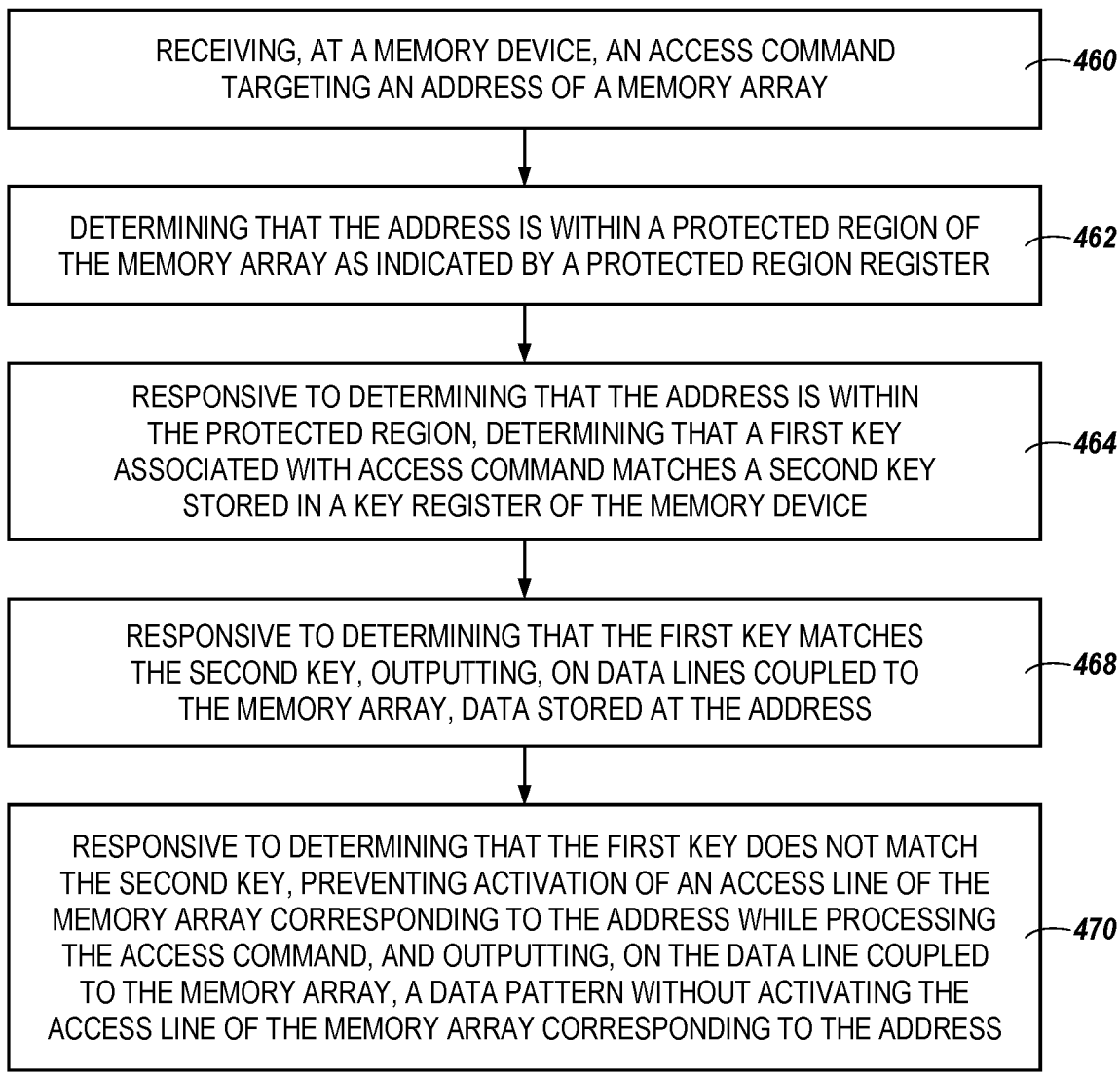
FIG. 4 illustrates an example flow diagram of a method for accessing a protected region of a memory array in accordance with a number of embodiments of the present disclosure.

FIG. 4 illustrates an example flow diagram of a method for accessing a protected region of a memory array in accordance with a number of embodiments of the present disclosure. The method can be executed by a memory device of a computing system.

At 460, a memory device can receive an access command targeting an address of a memory array. At 462, a determination can be made as to whether the address is within a protected region of the memory arrays as indicated by a protected region register. The address can be determined to be within the protected region if the address is greater than a starting address of the protected region but less than the ending address of the protected region. In various examples, the access command can be associated with a plurality of addresses to access. The plurality of addresses can be considered to be within the protected region if at least one of the plurality of addresses is between the starting address and the ending address of the protected region.

At 464, responsive to determining that the address is within the protected region, the controller can determine whether a received key associated with the access subcommand matches a key stored in a key register of the memory device. The received key can be considered to match the stored key if the received key is equal to the stored key. In a number of embodiments, the received key and/or the stored key may be encrypted in a manner such that one can be derived from the other.

At 468, responsive to determining that the received key matches the stored key, the controller can output, on data lines coupled to the memory array, data stored at the address. The controller can allow access to the address by setting a mode register to an unlocked mode to allow a row driver to activate. The memory device can allow access to the address by providing the data stored at memory cells having the address to the host. Access can be allowed by allowing an activation of a row of the array corresponding to the address. The method can further allow activation of a row to which the address corresponds by switching an access enable flag from a first state to a second state, wherein rows corresponding to addresses within the protected region are not activatable unless the access enable flag is in the second state. The second state can correspond to the non-persistent unlocked mode.

At 470, responsive to determining that the received key does not match the stored key, the memory array can be controlled to prevent activation of an access line of the memory array corresponding to the address while processing the access command and output, on the data line coupled to the memory array, a data pattern without activating the access line of the memory array corresponding to the address. The data pattern can be generated via a plurality of latches (e.g., keeper latches) coupled to data lines (e.g., DQs) of the memory device. In a number of embodiments, the data pattern generated and output on the data lines responsive to determining a key mismatch can be a fixed pattern.

However, in various examples, the data pattern is a substantially random data pattern (e.g., a pseudo-random data pattern). Providing a non-fixed data pattern can have various benefits. For instance, outputting a non-fixed data pattern can prevent an entity attempting unauthorized access from easily detecting that their access attempts are being prevented (e.g., blocked). A pseudo-random data pattern can be generated, for example, using a linear-feedback shift register (LFSR). A LFSR is a shift register whose input bit is a linear function of its previous state. The LFSR can be seeded utilizing receipt of a memory command such as an access command. For example, the LFSR can be seeded based on the processing of a refresh command, an activate command, and/or a time based update. The time based update can be based on, for instance, an oscillator and/or an elapsed time interval. The LFSR and circuitry associated with the LFSR can be a pseudo random generator that can be used to provide the values that comprise the data stored in the keeper latches coupled to the data lines. The LFSR circuitry can be part of control circuitry or can be separate from the control circuitry. A 64 bit LFSR can provide 64 outputs to respective keeper latches and 64 inverse outputs to the respective keeper latches.

In various instances, responsive to determining that the received address corresponds to the protected region and responsive to determining that the received key does not match the stored key, the control circuitry can update a plurality of data lines wherein the plurality of data lines provide data from the memory array responsive to receipt of the access command. The control circuitry can reset a plurality of latches coupled to the plurality of data lines to update the plurality of data lines. Resetting the plurality of latches can include modifying the data stored in the respective keeper latches by forcing the respective keeper latches to a particular state such that a fixed data pattern is output on the data lines. The plurality of latches can comprise NOR keeper latches (e.g., NOR latches). Each of the NOR keeper latches can include an inverter gate and a NOR gate. In various examples, each of the latches can include a plurality of NOR gates and a plurality of AND gates.

The plurality of latches can be activated responsive to receipt of the access command. The plurality of latches can be activated to reset the plurality of latches. The plurality of latches can be activated regardless of whether the access command is authorized or unauthorized. Resetting the plurality of latches responsive to receipt of the access command can be slower than refraining from resetting the latches. However, resetting the plurality of latches responsive to receipt of the access command can clear the data stored in the plurality of latches to prevent the data that was stored in the latches from being provided.

The latches can be updated by providing a signal and inverse of the signal to each of the plurality of latches. The signal and inverse signal can be consistent with providing a same (e.g., fixed) data pattern responsive to each of the unauthorized access commands. In some instances, a random signal and an inverse of the random signal can be provided to each of the plurality of latches responsive to receipt of the access command. Providing the random signal can be consistent with providing a different random number to each of the unauthorized access commands.

In various embodiments, the data (e.g., data pattern) can be generated after activating a plurality of sensing amplifiers. The sensing amplifiers can be activated responsive to processing the access commands. Generating the data, by updating the latches, after activating the plurality of sensing amplifiers can ensure that data stored in the sensing amplifiers and not associated with an unauthorized access command is not provided to the data lines after the plurality of latches and by extension the plurality of data lines. If the latches and the data lines are updated before the sensing amplifiers are updated, then the data lines can be updated a second time responsive to moving the charges stored in the sensing amplifiers to the data lines.

Figure 5:
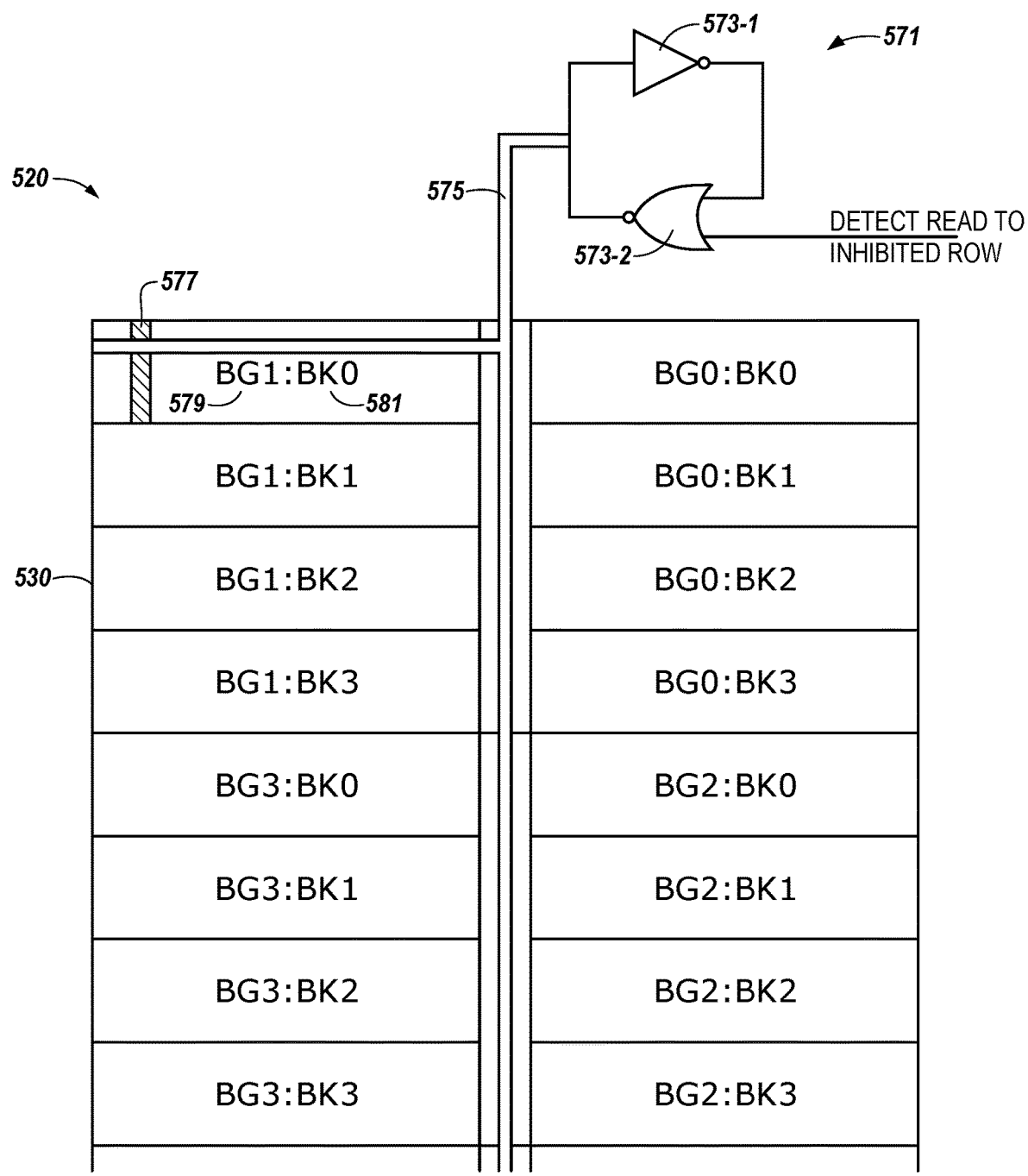
FIG. 5 is a block diagram of an apparatus in the form of a memory device including a memory array and a plurality of latches in accordance with a number of embodiments of the present disclosure.

FIG. 5 is a block diagram of an apparatus in the form of a memory device 520 including a memory array 530 and a plurality of latches 571 in accordance with a number of embodiments of the present disclosure. The memory device 520 is analogous to memory devices 120 and 220 in FIGS. 1 and 2, respectively. The memory device 520 includes the memory array 530.

The memory array 530 includes a plurality of bank groups 579 (e.g., BG0 to BG3). FIG. 5 shows four bank groups 579 but the memory array 530 can include more or fewer bank groups than those shown herein. Each of the bank groups includes a plurality of banks 581 (e.g., BK0 to BK3). A bank can include a plurality of rows and columns of the memory array 530. Each of the banks can include a plurality of sense amplifiers 577.

Each of the sense amplifiers 577 can be coupled to a plurality of data lines 575. The plurality of data lines 575 can be coupled to the latches 571. The latches 571 shown in FIG. 5 are NOR keeper latches. However, the latches 571 can also be other types of latches that can be controlled by the control circuitry. The latches 571 can include a NOT gate 573-1 and a NOR gate 573-2. The result of the NOT gate 572-1 can be provided to the NOR gate 573-2 as an input. The NOR gate 573-2 can also receive a signal from the controller. The signal from the controller can convey a detection of a read to an inhibited row. The read to the inhibited row can include an access command corresponding to the inhibited row. As such, the control circuitry can set a value stored in the latches 571 by providing a signal to the NOR gate 573-2. Although a single latch is shown in FIGS. 5 and 6, the memory device 520 can include a plurality of latches such that the quantity of latches is equal to the quantity of data lines.

Figure 6:
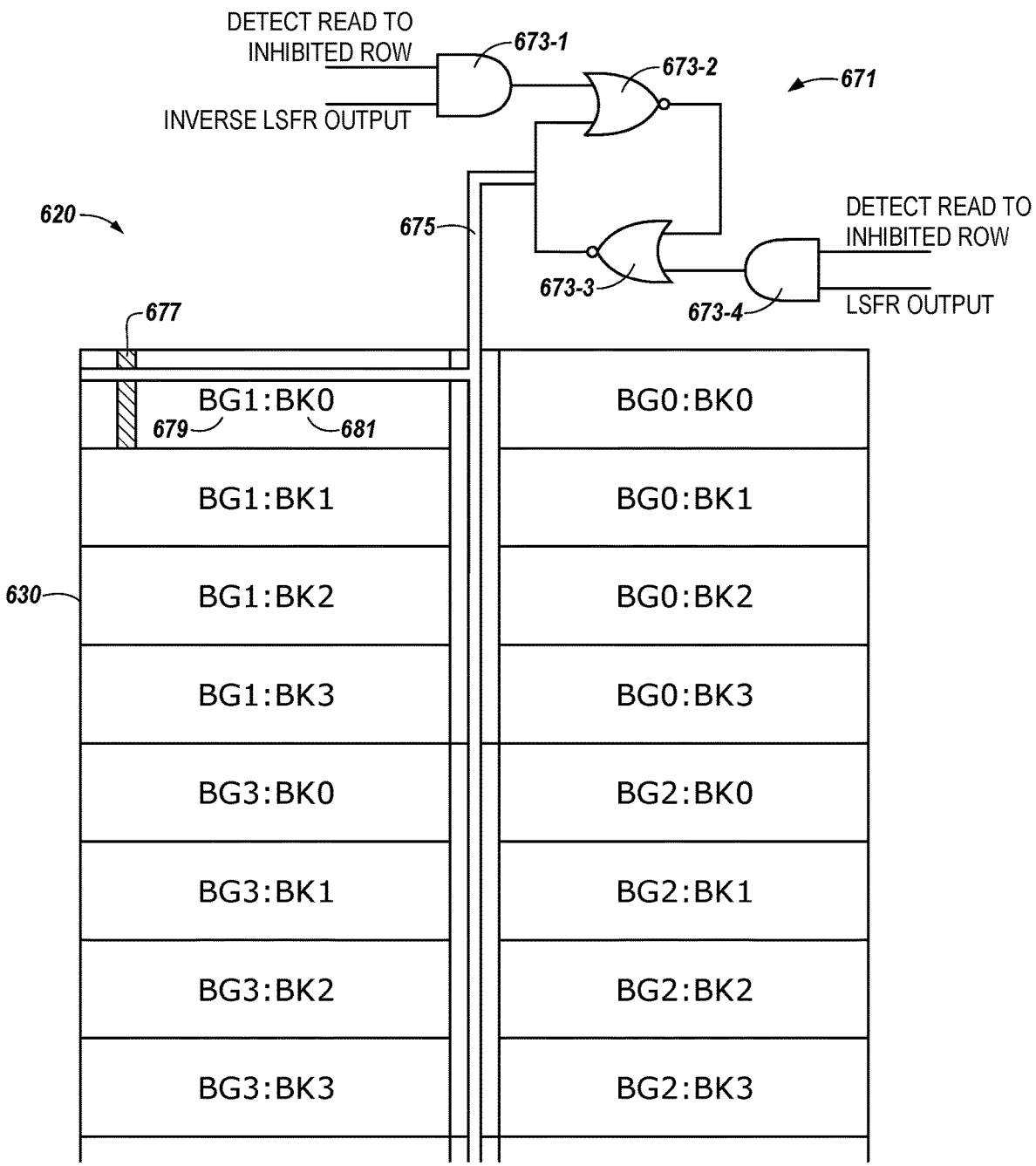
FIG. 6 is a block diagram of an apparatus in the form of a memory device including a memory array and a plurality of latches in accordance with a number of embodiments of the present disclosure.

FIG. 6 is a block diagram of an apparatus in the form of a memory device 620 including a memory array and a plurality of latches in accordance with a number of embodiments of the present disclosure. The memory device 620 is analogous to memory device 520 in FIG. 5. The memory device 620 includes the memory array 530. The memory device includes bank groups 679 and the banks 681 where each of the bank groups is comprised of a plurality of banks 681.

Each of the banks includes a plurality of sense circuitries 677. The sense circuitries 677 are coupled to the data lines 675 which are coupled to the latches 671.

The latches 671 can be updated with a random number provided by a pseudo random number generator. Each of the latches 671 includes a plurality of AND gates 673-1 and 673-4 and a plurality of NOR gates 673-2 and 673-3. The AND gate 673-1 can receive a signal indicating whether a read command to an inhibited row has been detected. For example, the signal can indicate whether an unauthorized access command to a protected region has been detected. The AND gate 673-1 can also receive a signal from a pseudo random number generator. For example, the AND gate 673-1 can receive an inverse of an output of the LSFR. The AND gate 673-4 can receive the signal indicating whether a read command to an inhibited row has been detected. The AND gate 673-4 can also receive an output of the LSFR. The NOR gate 673-2 can receive the output from the AND gate 673-1 and the output of the NOR gate 673-3. The NOR gate 673-2 can be coupled to the data lines such the data lines and the output form the NOR gate 673-3 merge to provide the input of the NOR gate 673-2. The output of the NOR gate 673-2 can be provided as an input to the NOR gate 673-3. The NOR gate 673-3 can also receive the output of the AND gate 673-4 as an input.

Figure 7:
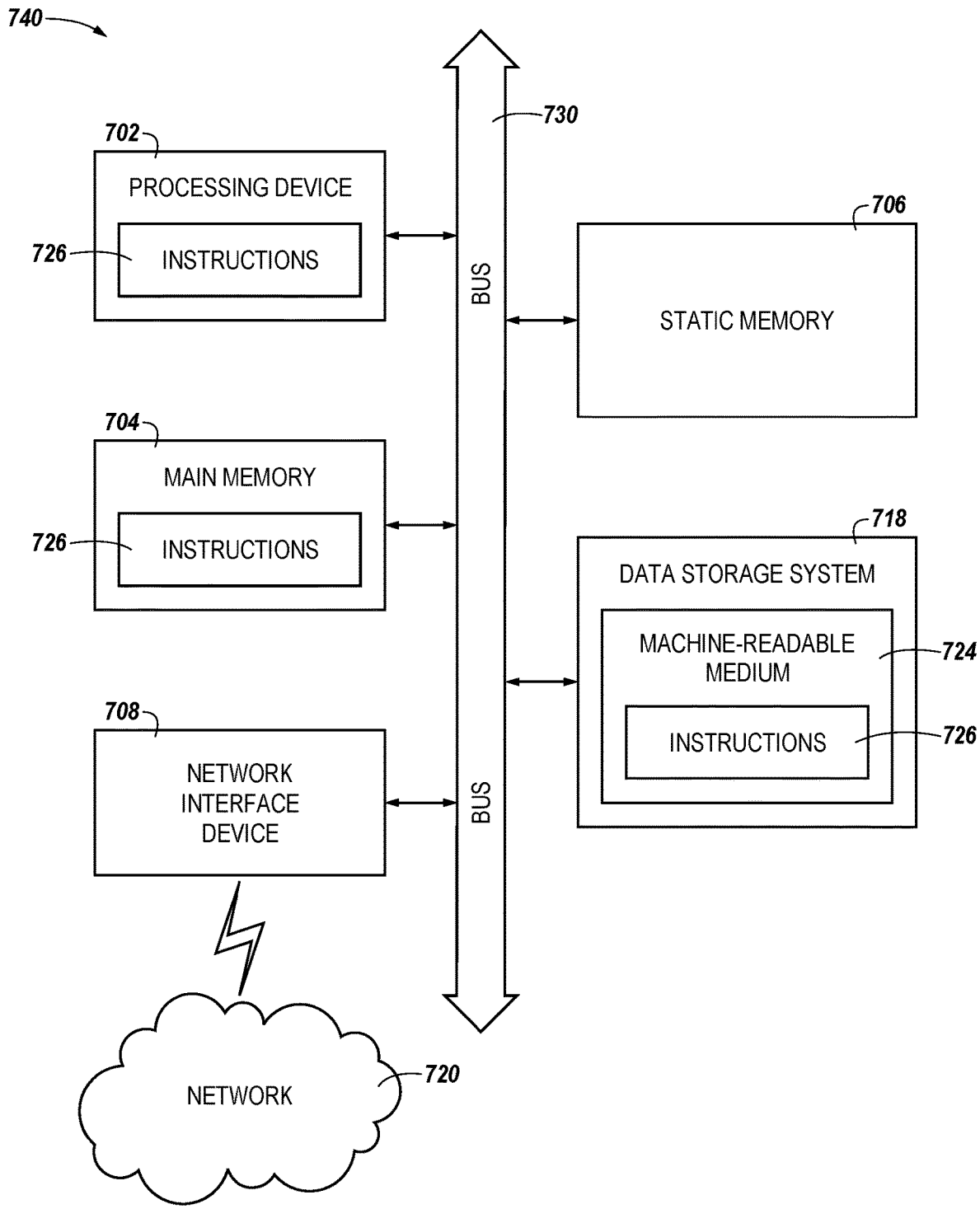
FIG. 7 illustrates an example machine of a computer system within which a set of instructions, for causing the machine to perform various methodologies discussed herein, can be executed.

FIG. 7 illustrates an example machine of a computer system 740 within which a set of instructions, for causing the machine to perform various methodologies discussed herein, can be executed. In various embodiments, the computer system 740 can correspond to a host system (e.g., the system 110 of FIG. 1) that includes, is coupled to, or utilizes a memory sub-system (e.g., the memory device 120 of FIG. 1) or can be used to perform the operations of a controller (e.g., the controller 140 of FIG. 1, including the register 224, 226, 228, and 231 of FIG. 2). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 740 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage system 718, which communicate with each other via a bus 730.

Processing device 702 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 can also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein. The computer system 740 can further include a network interface device 708 to communicate over the network 720.

The data storage system 718 can include a machine-readable storage medium 724 (also known as a computer-readable medium) on which is stored one or more sets of instructions 726 or software embodying any one or more of the methodologies or functions described herein. The instructions 726 can also reside, completely or at least partially, within the main memory 704 and/or within the processing device 702 during execution thereof by the computer system 740, the main memory 704 and the processing device 702 also constituting machine-readable storage media.

In one embodiment, the instructions 726 include instructions to implement functionality corresponding to the controller 140 of FIG. 1. While the machine-readable storage medium 724 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Although specific embodiments have been illustrated and described herein, those of ordinary skill in the art will appreciate that an arrangement calculated to achieve the same results can be substituted for the specific embodiments shown. This disclosure is intended to cover adaptations or variations of various embodiments of the present disclosure. It is to be understood that the above description has been made in an illustrative fashion, and not a restrictive one. Combinations of the above embodiments, and other embodiments not specifically described herein will be apparent to those of skill in the art upon reviewing the above description. The scope of the various embodiments of the present disclosure includes other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
   a memory array;
   control circuitry coupled to the memory array and configured to:
   receive an access command targeting a particular address within the memory array;
   responsive to determining that the received access command is not authorized to access the particular address, update a plurality of data lines configured to provide data from the memory array responsive to receipt of access commands wherein the plurality of data lines are updated by resetting a plurality of latches coupled to the plurality of data lines to update the plurality of data lines.

2. The apparatus of claim 1, further comprising:
   a first register configured to indicate whether the particular address is currently protected;
   a second register configured to store addresses defining a region of the memory array;
   a third register configured to store a key used to determine whether the access command is allowed access to the region; and
   wherein the control circuitry is further configured to:
   determine that the particular address is in the region of the memory array;
   determine that a received key associated with the received access command matches the key stored in the third register; and
   responsive to determining that the particular address corresponds to the region and that the received key does not match the stored key, determine that the received access command is not authorized to access the particular address.

3. The apparatus of claim 1, wherein the plurality of latches are configured to output a known value.

4. The apparatus of claim 3, wherein the plurality of latches comprise NOR keeper latches and wherein each of the NOR keeper latches include an inverter gate and a NOR gate.

5. The apparatus of claim 1, wherein each of the latches is coupled to a plurality of NOR gates and a plurality of AND gates.

6. The apparatus of claim 1, wherein the control circuitry is further configured to activate the plurality of latches responsive to receipt of the access command.

7. The apparatus of claim 6, wherein the control circuitry is further configured to provide a signal and an inverse of the signal to each of the plurality of latches responsive to receipt of the access command.

8. The apparatus of claim 6, wherein the control circuitry is further configured to provide a pseudo-random signal and an inverse of the pseudo-random random signal to each of the plurality of latches responsive to receipt of the access command.

9. The apparatus of claim 1, wherein the control circuitry is further configured to update the plurality of data lines to provide a data pattern through the plurality of data lines.

10. The apparatus of claim 9, wherein the data pattern is the same for a plurality of access commands.

11. The apparatus of claim 10, wherein the data pattern is different for each of the plurality of access commands.

12. The method comprising:
    receiving, at a memory device, an access command targeting an address of a memory array;
    determining whether the address is within a region of the memory array as indicated by a first register;
    responsive to determining that the address is within the region, determining whether a first key associated with the access command matches a second key stored in a second register of the memory device;
    responsive to determining that the first key matches the second key, outputting, on data lines coupled to the memory array, data stored at the address; and
    responsive to determining that the first key does not match the second key:
    preventing activation of an access line of the memory array corresponding to the address while processing the access command wherein the access command is a read command and wherein processing the access command further comprises modifying data stored in respective keeper latches coupled to the data lines to generate a data pattern to be output on the data lines; and outputting, on the data lines coupled to the memory array, the data pattern without activating the access line of the memory array corresponding to the address.

13. The method of claim 12, wherein modifying the data stored in the respective keeper latches comprises forcing the respective keeper latches to a particular state such that a fixed data pattern is output on the data lines.

14. The method of claim 13, wherein the respective keeper latches comprise a NOR gate, and wherein forcing the respective keeper latches to the particular state comprises providing a particular input signal to the NOR gate responsive to determining that that the address is within the region and that the first key does not match the second key.

15. The method of claim 12, wherein modifying the data stored in the respective keeper latches comprises forcing the respective keeper latches to respective states such that a non-fixed data pattern is output on the data lines.

16. The method of claim 15, further comprising utilizing values of a linear-feedback shift register (LFSR) to modify the data stored in the respective keeper latches.

17. The method of claim 16, further comprising, updating the LFSR values based on at least one of:
receipt, by the memory device, of a particular command; and
an elapsed time interval.

18. A system, comprising:
a host comprising a processing resource configured to execute an operating system (OS); and
a memory device configured to:
responsive to a received access command, determine whether an address corresponding to the access command is within a region of a memory array;
responsive to determining that the address is within the region, determine whether a received key associated with the access command matches a key stored in a register;
responsive to determining that the received key matches the key stored in the register, allow access to the address of the memory array; and
responsive to determining that the received key does not match the key stored in the register:
update a plurality of data lines after activating a plurality of sense amplifiers, wherein the plurality of sense amplifiers are activated responsive to processing the access command, wherein the plurality of data lines are updated by resetting a plurality of latches coupled to the plurality of data lines to update the plurality of data lines.

19. The system of claim 18, wherein the memory device is further configured to, responsive to determining that the received key does not match the key stored in the register, refrain from activating a row of the memory array, wherein the row corresponds to the address.

20. The system of claim 18, wherein the memory device is configured to update the plurality of data line with data and provide the data to the host via the plurality of data lines.

21. The system of claim 18, wherein the memory device is configured to provide data to the host responsive to determining that the received key does not match the key stored in the register.

* * * * *